(12) United States Patent
Ultsch

(10) Patent No.: US 11,697,360 B2
(45) Date of Patent: Jul. 11, 2023

(54) VEHICLE SEAT WITH A ROCKER COMPONENT ADJUSTABLE BY EXTERNAL ACTUATION, AND A LOCKING UNIT

(71) Applicant: Brose Fahrzeugteile SE & Co. Kommanditgesellschaft, Coburg, Coburg (DE)

(72) Inventor: Johannes Ultsch, Lichtenfels (DE)

(73) Assignee: Brose Fahrzeugteile SE & Co. Kommanditgesellschaft, Coburg

( * ) Notice: Subject to any disclaimer, the term of this patent is extended or adjusted under 35 U.S.C. 154(b) by 151 days.

(21) Appl. No.: 17/058,968

(22) PCT Filed: May 28, 2019

(86) PCT No.: PCT/EP2019/063714
§ 371 (c)(1),
(2) Date: Nov. 25, 2020

(87) PCT Pub. No.: WO2019/229012
PCT Pub. Date: Dec. 5, 2019

(65) Prior Publication Data
US 2021/0206296 A1 Jul. 8, 2021

(30) Foreign Application Priority Data
May 30, 2018 (DE) .................. 10 2018 208 641.9

(51) Int. Cl.
*B60N 2/02* (2006.01)
*B60N 2/12* (2006.01)
(52) U.S. Cl.
CPC ............ *B60N 2/0276* (2013.01); *B60N 2/12* (2013.01); *B60N 2002/0236* (2013.01)

(58) Field of Classification Search
CPC ........ B60N 2/16; B60N 2/165; B60N 2/0276; B60N 2002/0236; B60N 2/3063; B60N 2/0224
See application file for complete search history.

(56) References Cited

U.S. PATENT DOCUMENTS 6,152,533 A * 11/2000 Smuk .................. B60N 2/36
297/378.12
6,827,404 B2 * 12/2004 Blair ................... B60N 2/206
297/378.12
(Continued)

FOREIGN PATENT DOCUMENTS

DE 29700293 U1 2/1997
DE 19758237 A1 7/1998
(Continued)

*Primary Examiner* — Philip F Gabler
(74) *Attorney, Agent, or Firm* — Dickinson Wright PLLC

(57) ABSTRACT

A vehicle seat, with a seat part which is adjustable in relation to a vehicle floor, on which the vehicle seat is arranged, by external actuation via at least one pivotably mounted rocker component and with the aid of a drive unit operatively connected to the rocker component, and, for access to a vehicle region located behind the vehicle seat is foldable from a use position into an adjustment position, wherein at least on locking unit is provided which, in a locking position, blocks the seat part against folding from a use position into the adjustment position and, in a release position, permits folding of the seat part from the use position into the adjustment position. The operative connection between the drive unit and the rocker component is separable here via the locking unit in the release position thereof.

15 Claims, 9 Drawing Sheets

(56) References Cited

U.S. PATENT DOCUMENTS

| | | | |
|---|---|---|---|
| 9,061,606 B2* | 6/2015 | Mizuno | B60N 2/06 |
| 10,618,444 B2* | 4/2020 | Kish | B60N 2/1615 |
| 11,358,501 B2* | 6/2022 | Susko | B60N 2/3072 |
| 2013/0026806 A1* | 1/2013 | Yamada | B60N 2/1675 |
| | | | 297/311 |
| 2016/0375801 A1* | 12/2016 | Ikeda | B60N 2/168 |
| | | | 74/89.18 |
| 2017/0101033 A1* | 4/2017 | Ferenc | B60N 2/165 |
| 2017/0253146 A1* | 9/2017 | Cooley | B60N 2/123 |
| 2019/0152352 A1* | 5/2019 | Handigol | B60N 2/1615 |

FOREIGN PATENT DOCUMENTS

| | | |
|---|---|---|
| DE | 10020923 A1 | 12/2001 |
| DE | 102007054537 B3 | 6/2009 |
| DE | 102010063972 A1 | 6/2012 |

\* cited by examiner

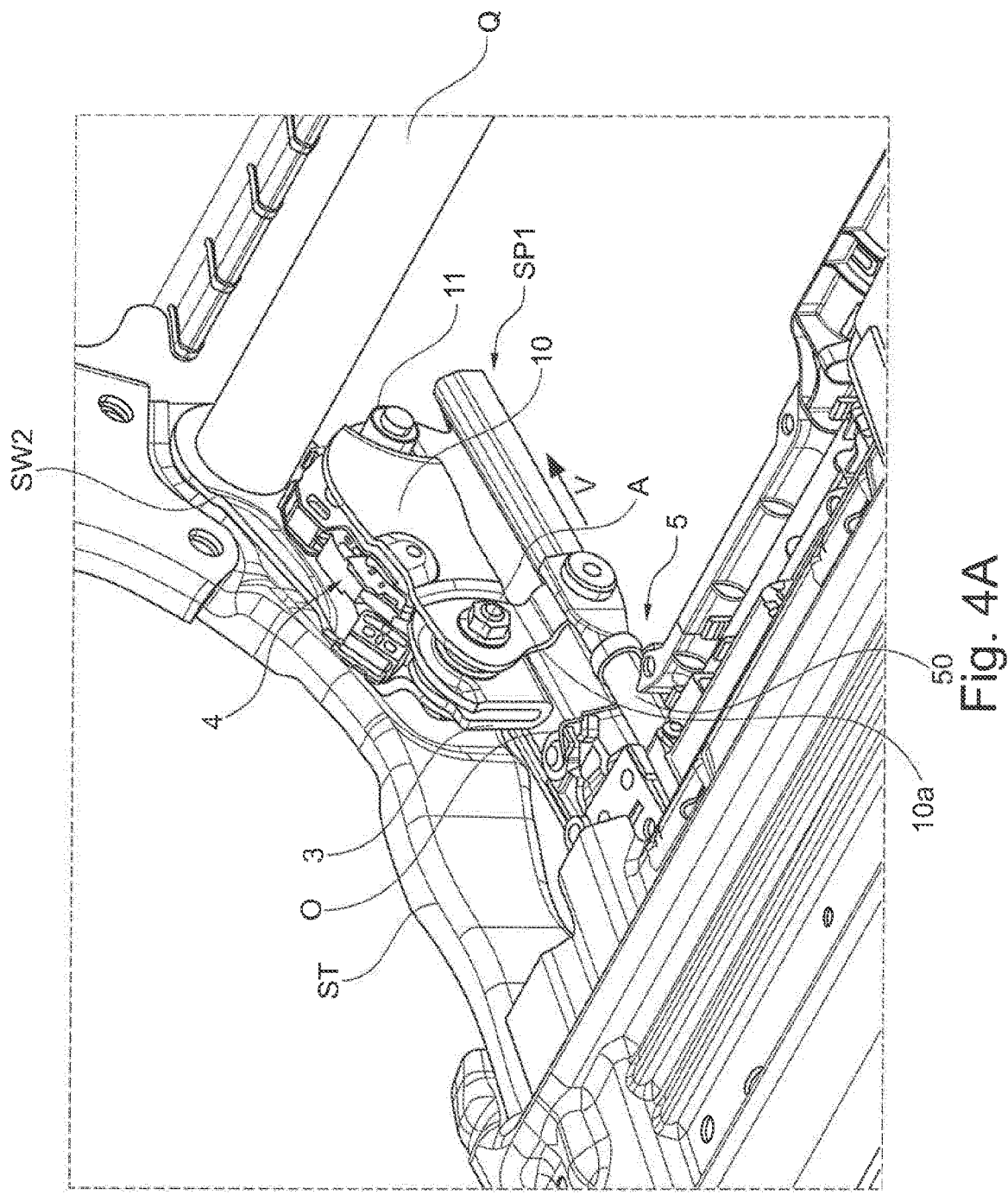

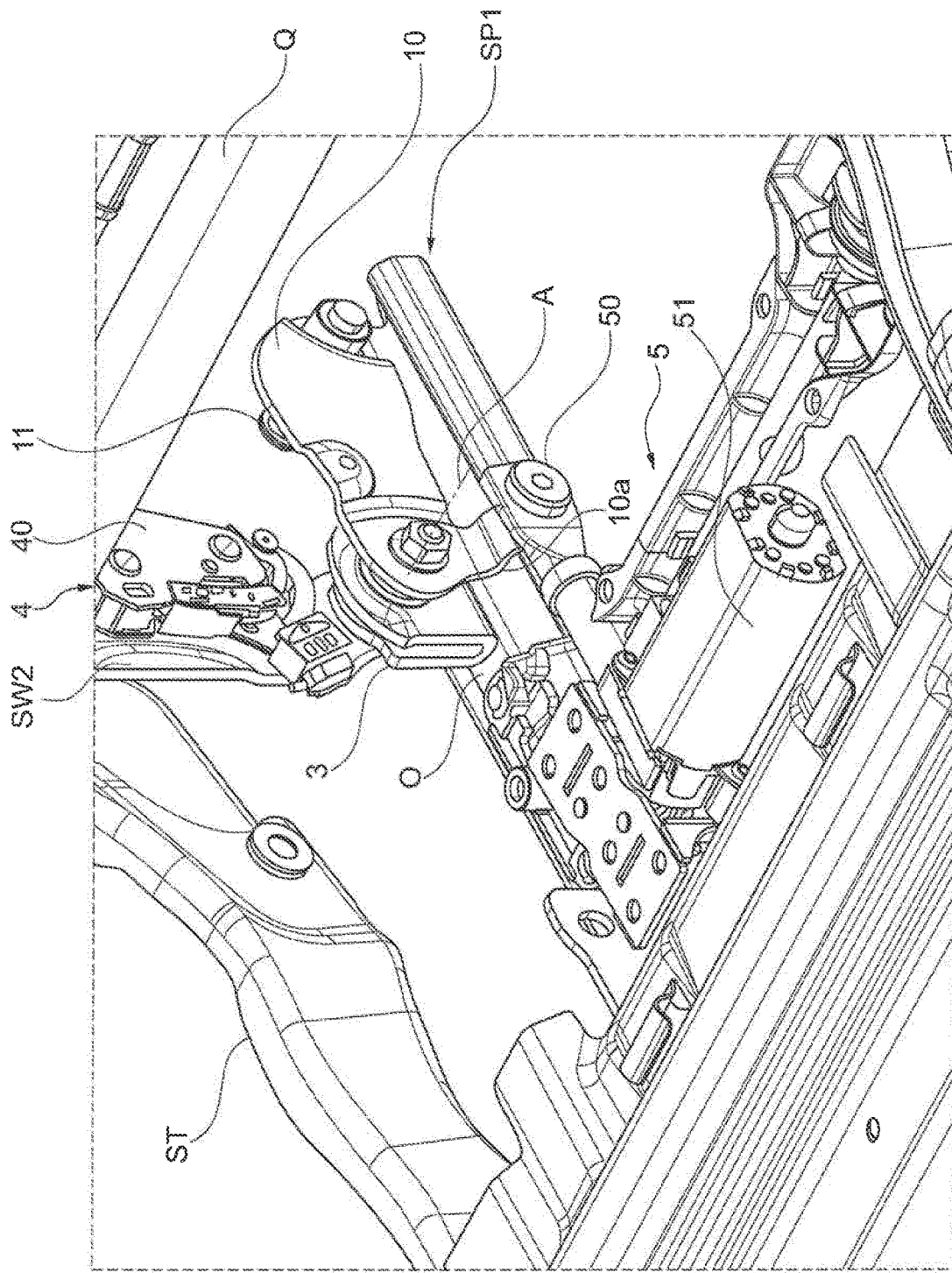

VEHICLE SEAT WITH A ROCKER COMPONENT ADJUSTABLE BY EXTERNAL ACTUATION, AND A LOCKING UNIT

CROSS-REFERENCE TO RELATED APPLICATIONS

This application is the U.S. National Phase of PCT Application No. PCT/EP2019/063714 filed on May 28, 2019, which claims priority to German Patent Application No. DE 10 2018 208 641.9, filed on May 30, 2018, the disclosures of which are hereby incorporated in their entirety by reference herein.

TECHNICAL FIELD

The present disclosure relates to a vehicle seat.

BACKGROUND

What is widely known from practice are vehicle seats which include a seat part that is adjustable by external actuation relative to a vehicle floor via at least one pivotally mounted rocker component and via a drive unit operatively connected to the rocker component. Via the drive unit, e.g. an adjusting force may then be generated in order to provide an electrically controllable entry aid at the vehicle seat. In this way, the seat part and hence the vehicle seat may be adjusted by external actuation in order to be able to adjust e.g. an inclination of the seat part and/or to swing the vehicle seat forwards by external actuation in order to provide for a facilitated access to a vehicle area located behind the vehicle seat.

In particular for an emergency exit it is known to additionally provide such vehicle seats with a locking unit, usually in the form of a lock, which in a locking position blocks the seat part against folding from a use position into an adjustment position in which a (facilitated) access to a vehicle area located behind the vehicle seat is granted, and in a release position permits folding of the seat part from a use position into the adjustment position. Manually folding from one of several possible use positions into the one adjustment position (folded forwards), in which in case of emergency a facilitated access from a vehicle area located behind the vehicle seat is possible, usually is provided for by a lock or two locks in the region of the backrest pivot point of the vehicle seat, which permit targeted unlocking when necessary. Two locks—or comparable locking units of a vehicle seat—then for example are connected to each other via a Bowden cable or a coupling. In this connection it is furthermore known that a locking unit provides a locking with a vehicle floor and then, in a release position, permits folding of the seat part from a use position into the adjustment position.

In vehicle seats commonly used so far, a drive unit provided for the power-operated adjustment of the seat part and an adjustment mechanism for folding the seat part from a use position into the adjustment position folded forwards, which is provided for example for an emergency exit, are separated from each other and hence in principle decoupled from each other and independently controllable. Whether a locking unit of the vehicle seat, via which an adjustment into the adjustment position may be enabled, is disposed in a locking position or in a release position, regularly does not influence the operability of the adjustment mechanism drivable via the drive unit. The adjustment mechanism for the power-operated adjustment of the seat part and at least one independent locking unit for blocking against inadvertent folding of the seat part into the adjustment position correspondingly each frequently are comparatively space-consuming and complex.

Thus, there is a need for a vehicle seat improved in this respect.

SUMMARY

In one or more embodiments, vehicle seat provided with an operative connection between the drive unit and the rocker component that may be separated via the at least one locking unit disposed in its release position. The operative connection due to which an adjusting force generated by the drive unit by external actuation may be transmitted to at least one rocker component in order to adjust the seat part of the vehicle seat by external actuation hence may be interrupted via the locking unit.

A transfer of force between the drive unit and the rocker component thus may be interrupted via the locking unit so that a transfer of the seat part from a use position into the adjustment position is possible independently of the drive unit and an adjustment mechanism including the rocker component, which is provided for the adjustment from a use position into the adjustment position, may be decoupled from the drive unit. While in the locking position of the locking unit the operative connection between drive unit and rocker component does exist, this operative connection may be released in the release position. In the release position of the locking unit, the seat part may be transferred into the adjustment position without an adjusting force generated by the drive unit having to be transmitted to the rocker component or possibly even without such an adjusting force being transmittable at all to the rocker component. While in the locking position of the locking unit an adjusting force generated by the drive unit may be transmitted to the rocker component in order to be able to adjust the seat part by external actuation and hence for example adjust an inclination and/or height of the seat part by external actuation and/or to be able to adjust the seat part in the direction of or even into the adjustment position, the locking unit in its release position is provided for decoupling from the drive unit and the rocker component. In one or more embodiments the locking unit, at least in its locking position, provides at least a part of a releasable mechanical coupling between the drive unit and the rocker component in order to be able to transmit an adjusting force generated by the drive unit to an adjustment mechanism of the vehicle seat comprising the rocker component and, when necessary, provide for an (e.g. manual) adjustment independently of the drive unit.

In principle, one or more embodiments thus proceeds from the fundamental idea that via the possibly electromotive drive unit a power-operated adjustment of the rocker component becomes possible when the locking unit is in its locking position. Via the possibility for separating the operative connection between the drive unit and the rocker component and hence for decoupling between drive unit and rocker component in the release position of the locking unit, the rocker component may still be swung when a locking via the locking unit is released and the locking unit is transferred into its release position, for example in the case of a power failure or a damage of the drive unit after a crash of the rocker component. Thus, a releasable mechanical connection between the drive unit and the rocker component is provided via the locking unit.

As an example, the locking unit in its locking position locks via a locking element which is connected to the rocker component or to a swivel element adjustable via the drive unit. The locking element, for example a bolt-shaped locking element, such as a lock bolt, may be directly or indirectly connected to the swivel element or the rocker component. For example, the locking element is rigidly, i.e. without a possibility for relative movement, connected to the swivel element or the rocker component. A part of the adjusting force generated by the drive unit, which is guided over the locking element, thus acts directly onto the rocker component connected thereto or to the swivel element connected thereto, without a relative movement occurring between the locking element and the rocker component or the swivel element, when the locking unit is properly disposed in its locking position and a power-operated adjustment of the seat part is effected via the drive unit.

The swivel element adjustable via the drive unit, by which the locking element possibly is locked, is pivotable in one embodiment. In the locking position of the locking unit, a pivotal movement of the swivel element controlled by the drive unit then for example leads to a pivotal movement of the rocker component, in that a mechanical coupling between swivel element and rocker component is provided via the locking unit and the locking element. In the release position of the locking unit the rocker component may be (manually) adjusted independently of an adjustment of the swivel element. Thus, the rocker component and the swivel element then are decoupled from each other.

In principle, an adjusting force applied by the drive unit may be transferable from the swivel element to the rocker component via a locking element by means of which the locking unit is locked in its locking position. Correspondingly, the locking element provides the above-mentioned mechanical coupling between swivel element and rocker component.

In one or more embodiments, the drive unit is provided on the swivel element. Consequently the drive unit here is adjustable together with the swivel element, when an adjustment of the seat part controlled by external actuation is to be effected via the drive unit. In this connection it is provided for example that a housing of the drive unit is fixed to the swivel element. Such a housing for example accommodates a drive motor and/or a transmission device of the drive unit. Thus, the drive unit may be arranged compactly on the swivel element.

In an alternative embodiment, the drive unit includes a drive element which engages the swivel element in order to transmit an adjusting force generated by the drive unit. Thus, this drive element possibly is connected to the swivel element in order to control an adjusting movement of the swivel element by a power-operated adjustment of the drive element with the drive unit. Thus, in this variant the drive unit is not provided on the swivel element itself, but merely engages the swivel element via a drive element. The drive unit, and hence a drive motor and possibly a transmission device of the drive unit, thus may be arranged on the vehicle seat spaced apart from the swivel element, e.g. on a floor assembly of the vehicle seat relative to which the seat part is adjustable or on a seat side part of the seat part which is adjustable relative to a vehicle floor.

In principle, the locking unit may be provided on the rocker component, on a swivel element adjustable via the drive unit or on a seat side part of the seat part adjustable relative to the vehicle floor.

In one design variant, for example, the locking unit is provided on the rocker component or on the seat side part. The locking unit then may lock via a locking element provided on the swivel element or via a locking element which is provided on a component that is indirectly or directly and/or rigidly connected to the swivel element. When the locking unit is provided on a swivel element adjustable via the drive unit, the locking unit locks for example via a locking element provided on the rocker component or by using a locking element which is provided with a component that is indirectly or directly and/or rigidly connected to the rocker component. Thus, in the two design variants outlined above, a locked locking unit provides a mechanical coupling between the rocker component and the swivel element, regardless of whether the locking unit is provided on the rocker component or on the swivel element.

The provision of the locking unit on the rocker component, a swivel element or a seat side part here includes the fact that a locking component of the locking unit (whose locking position corresponds with the locking position of the locking unit and whose release position corresponds with the release position of the locking unit), which is adjustable between a locking position and a release position, and/or a housing of the locking unit accommodating such a locking component is provided on the rocker component or the swivel element, for example is mounted thereon. A locking component may include for example an adjustable, or pivotable rotary latch of the locking unit.

In one or more embodiments, the rocker component is coupled with a seat side part of the seat part in order to adjust the seat part by external actuation and fold it into the adjustment position, wherein the swivel element is rotatably mounted on the seat side part of the seat part or on a seat component fixed thereto. The swivel element to be driven via the drive unit to perform a swivel movement in this variant also transmits an adjusting force to the rocker component via the locking unit disposed in its locking position. The support of the swivel element on the seat side part or on a seat component fixed thereto is combined for example with a fixation of the drive unit to the seat side part and a fixation of the locking unit to the rocker component. In particular, the swivel element may be rotatably supported on a seat component, e.g. a transverse tube or a transverse shaft, connecting two opposed seat side parts of the seat part to each other and each fixed thereto. The rocker component may also be (non-rotatably) fixed to the seat component, e.g. via a second end which is spaced apart from a pivotally mounted end of the rocker component.

In another embodiment, the rocker component is pivotally mounted on a bearing part of the vehicle seat. The bearing part may be provided for example on a shiftable mounted rail of a rail assembly, via which the vehicle seat is adjustable along a longitudinal axis.

In one exemplary embodiment the swivel element, which is adjustable via the drive unit (and which is connected to a locking element by means of which the locking unit locks in its locking position or on which the locking unit is provided), likewise is pivotally mounted on the bearing part.

As an example, the drive unit includes a translationally adjustable drive element. For the transmission of an adjusting force generated by the drive unit, this translationally adjustable drive element engages the swivel element, which in turn is pivotally mounted on the bearing part. The translationally adjustable drive element here may be part of a spindle gear which cooperates with the drive unit. In the locking position of the locking unit, this spindle gear consequently is provided to transmit an adjusting force generated by the drive unit via the swivel element to the rocker component.

In an alternative design variant, the drive unit includes a rotatable drive element, for example a drive pinion, which meshes with a toothing of the bearing part. The rotatable drive element then for example is part of a pinion gear. In the locking position of the locking unit this pinion gear consequently is provided to transmit an adjusting force generated by the drive unit via the swivel element pivotally mounted on the bearing part to the rocker component by the drive pinion meshing with the toothing of the bearing part. For example, by rotating the drive element and by meshing with the (stationary) bearing part, the swivel element is pivoted about a swivel axis defined by the bearing part and the rocker component thereby is entrained. The drive element therefor is rotatably mounted on the swivel element so that a rotary movement of the drive element controlled by the drive unit leads to a swivel movement of the swivel element relative to the bearing part. A mechanical coupling between the swivel element and the rocker component, which is provided by the locking unit in its locking position, then furthermore leads to a swivel movement of the rocker component.

In principle, the seat part together with a backrest of the vehicle seat may be foldable from a use position into the adjustment position. The backrest hence is fixed for example to the seat part so that a displacement of the seat part via a swivel movement of the at least one rocker component also leads to a (co-) adjustment of the backrest. Thus, when the seat part is folded (forwards) into the adjustment position, the backrest also is displaced in order to provide for a facilitated access to a vehicle area located behind the vehicle seat, in particular for example for an emergency exit.

A (manual) folding of the seat part into the adjustment position made possible by the locking unit in its release position, without actuating the usually motorized drive unit, in principle may be provided for an emergency exit. However, the present disclosure is not limited thereto. In principle, the (forward) folding of the seat part in the release position of the locking unit may also be provided for the provision of a comfort entry aid and/or as part of an easy-entry mechanism.

BRIEF DESCRIPTION OF THE DRAWINGS

The attached Figures by way of example illustrate possible design variants of the proposed solution.

In the drawings:

FIG. 4A, sectionally, shows another design variant of a proposed vehicle seat comprising an adjusting device with a spindle gear, in order to swivel the seat part by external actuation;

FIG. 4B shows the vehicle seat of FIG. 4A with the seat part manually folded forwards after actuation of the locking unit and hence after mechanically decoupling the drive unit and a pivotally mounted rocker of the vehicle seat from each other;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 6:
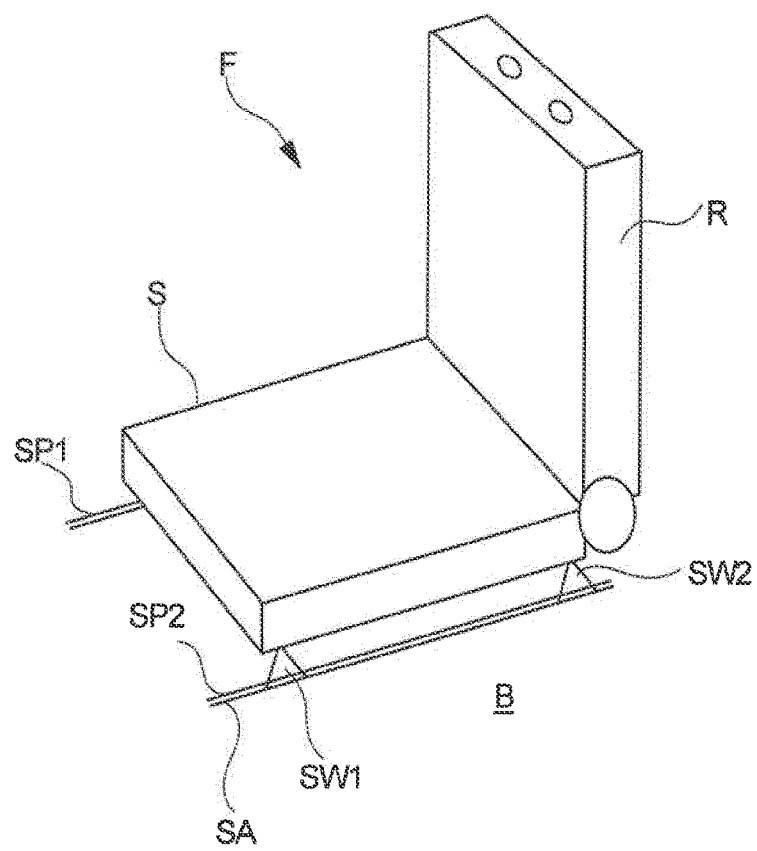
FIG. 6 schematically, and in a perspective view, shows a vehicle seat in which the adjusting devices of FIGS. 1 to 3B or 4A to 4B are employed.

FIG. 6 schematically, and in a perspective view, shows a vehicle seat F comprising a seat part S and a backrest R pivotally mounted thereon. The vehicle seat F is arranged on a vehicle floor B and is longitudinally shiftable on the vehicle floor B via a rail assembly SA. The rail assembly SA may include rail pairs SP1 and SP2 each extending along a longitudinal axis and parallel to each other.

On each rail pair SP1, SP2 two rockers SW1 and SW2 are provided for supporting the seat part S on the rail assembly SA. Via the rockers SW1 and SW2 a seat base of the seat part S, which carries a seat cushion of the vehicle seat F, is adjustably mounted with respect to the vehicle floor. A pair of rear rockers SW2 is of pivotal design in order to be able to on the one hand swing the seat part S and the backrest R fixed thereto forwards by external actuation and on the other hand fold the same forwards manually.

A power-operated swiveling of the rear rockers SW2 in the direction of front rockers B1 for example serves the adjustment of a seat inclination of the vehicle seat F in order to provide for a facilitated access for entry into or exit from a vehicle area located behind the vehicle seat F in connection with an entry aid—in particular when the vehicle seat F is used for a first or second seat row. In seat systems with such a vehicle seat F, which provides an entry aid, a manual forward folding of the vehicle seat F regularly must also be made possible for an emergency exit. Usually, there are provided separate locking units in the form of locks on both long sides and in a rear area each of the vehicle seat F.

In design variants of the proposed solution it is provided on the other hand that a locking unit, which in a locking position blocks the seat part S against folding from a use position into an adjustment position folded forwards, in a release position not only permits folding of the seat part S into the adjustment position folded forwards, but then also separates an operative connection between a (for example electromotive) drive unit and a rear rocker SW2. While the locking unit in the locking position thus mechanically couples the drive unit with the rocker SW2 and hence provides for a power transmission for swiveling the rocker SW2 for the power-operated adjustment of the seat part S, a mechanical decoupling becomes possible in the release position of the locking unit in order to manually permit swiveling of the rocker SW2 and hence folding of the seat part S via an adjustment mechanism of the vehicle seat F comprising the rocker SW2. When the locking unit is released, the seat part S together with the backrest R thus may be folded forwards independently of the drive unit even in the case of a power failure or a damage of the drive unit.

FIGS. 1 to 3B, 4A-4B and 5A-5B by way of example show different design variants for a corresponding adjusting device on the vehicle seat F.

In the design variant of FIGS. 1, 2 and 3A-3B an adjusting device for the adjustment of the seat part S may include an electromotive drive unit 1 which is fixed to a bearing plate 100 of a swivel element configured as a swiveling lever 10. The swiveling lever 10 is pivotally mounted on a bearing part 3. This bearing part 3 with a base 30 is fixed to an upper rail O of a rail pair SP1, for example by welding. On the rail-mounted bearing part 3, opposite the swiveling lever 10, the rear rocker SW2 likewise is pivotally mounted.

The bearing part 3 forms a tooth segment 31 protruding from the base 30, with which a rotatably mounted drive pinion 2 meshes. Away from a swivel axis A about which the rocker SW2 and the swiveling lever 10 each are pivotally mounted on the bearing part 3, this drive pinion 2 is rotatably mounted on the swiveling lever 10. The drive pinion 2 may be driven by the drive unit 1 to perform a rotation. During a rotation, the drive means 2 meshes with the tooth segment 31 of the bearing part 3 and, due to being mounted on the pivotable swiveling lever 10, is adjusted along the tooth segment 31 about the swivel axis A. A rotation of the drive pinion 2 thus leads to a swivel movement of the swiveling lever 10 about the swivel axis A relative to the rail-mounted bearing part 3.

Furthermore, not only the drive unit 1, but also a locking element in the form of a lock bolt 11 is provided on the swiveling lever 10. This lock bolt 11 is rigidly connected to the bearing plate 100 of the swiveling lever 10 so that the lock bolt 11 protrudes from a first side of the swiveling lever 10, which faces away from a second side of the swiveling lever 10, to which the drive unit 1 is fixed. The lock bolt 11 laterally protrudes from the bearing component 3 so that a locking unit in the form of a lock 4 may lock therewith, which locking unit is fixed to the rocker SW2 opposite the swiveling lever 10. The lock 4 is fixed to an inside of the rocker SW2, which faces the swiveling lever 10. Thus, the bearing part 3 substantially is located between the swiveling lever 10 and the rocker SW2 with the lock 4. With respect to a longitudinal direction defined by the rail pair SP1, the lock bolt 11 is located behind the bearing part 3 and its tooth segment 31 (see also FIGS. 3A and 3B).

The lock 4 includes a housing 40 in which in particular an adjustably mounted locking component in the form of a pivotable rotary latch 41 is accommodated. This housing 40 is arranged completely on the inside of the rocker SW2 and fixed thereto. In a locking position of the lock 4, the rotary latch 41 is locked with the protruding lock bolt 11 of the swiveling lever 10. Via the lock 4, the swiveling lever 10 and the electromotive drive unit 1 provided thereon then are mechanically coupled with the rocker SW2 carrying the lock 4. In particular the swiveling lever 10 and the rocker SW2 thus are mechanically rigidly coupled with each other via the lock 4. A swivel movement of the swiveling lever 10, which is controlled by the electromotive drive unit 1 and a pinion gear defined by the drive pinion 2 and the tooth segment 31 of the bearing part 3 meshing therewith, in this way leads to a synchronous swivel movement of the rocker SW2 about the common swivel axis A.

Figure 1:
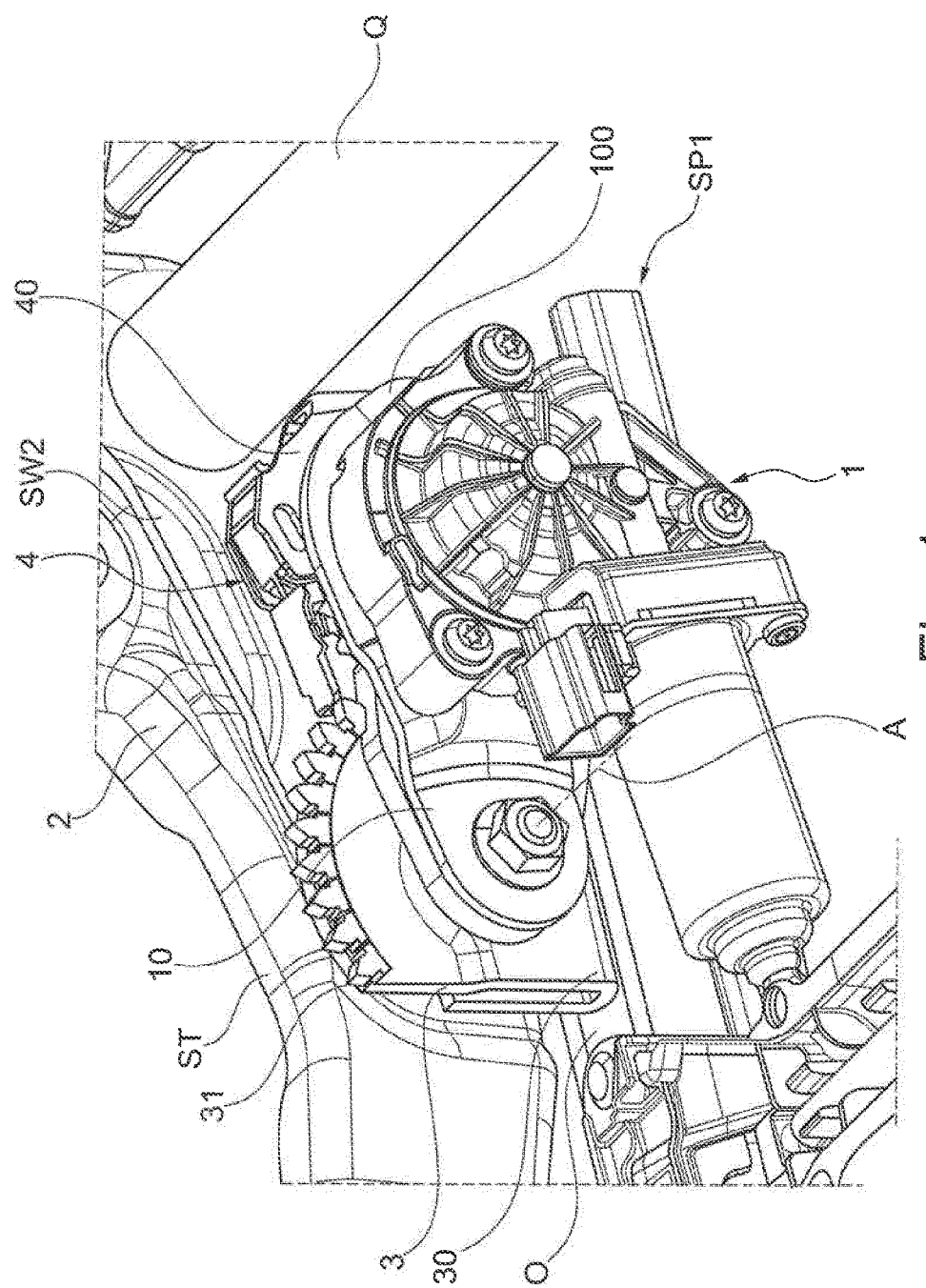
FIG. 1, sectionally, shows a design variant of a proposed vehicle seat comprising an adjusting device with a pinion gear for the power-operated adjustment of a seat part via a pivotally mounted rocker and an electromotive drive unit releasably connected thereto.
Figure 2:
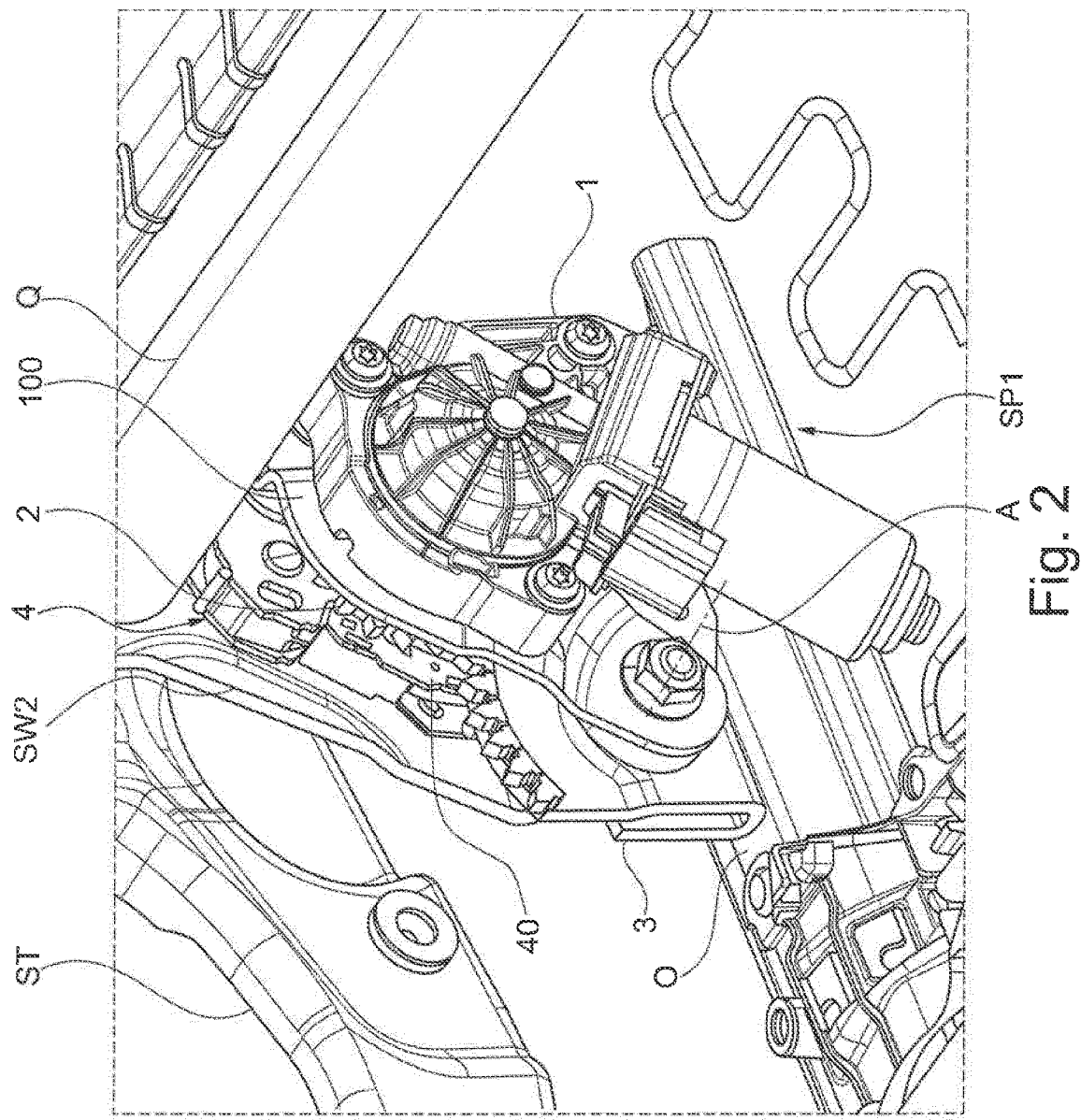
FIG. 2, sectionally, shows the vehicle seat with the adjusting device of FIG. 1 in an adjustment position taken by external actuation, in which a seat part of the vehicle seat is folded forwards.
Figure 3A:
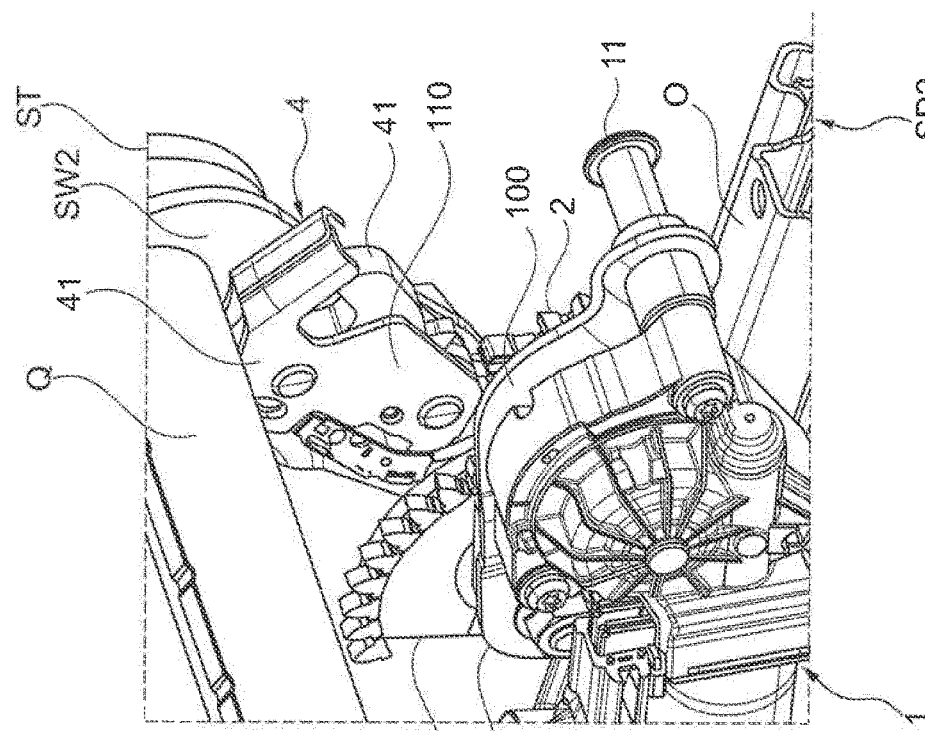
FIGS. 3A-3B, in various views, show the vehicle seat of FIGS. 1 and 2 with the adjusting device in the adjustment position of FIG. 2, which in FIGS. 3A and 3B, however, has been taken manually after actuation of a locking unit in the form of a lock and without actuation of the drive unit.
Figure 3B:
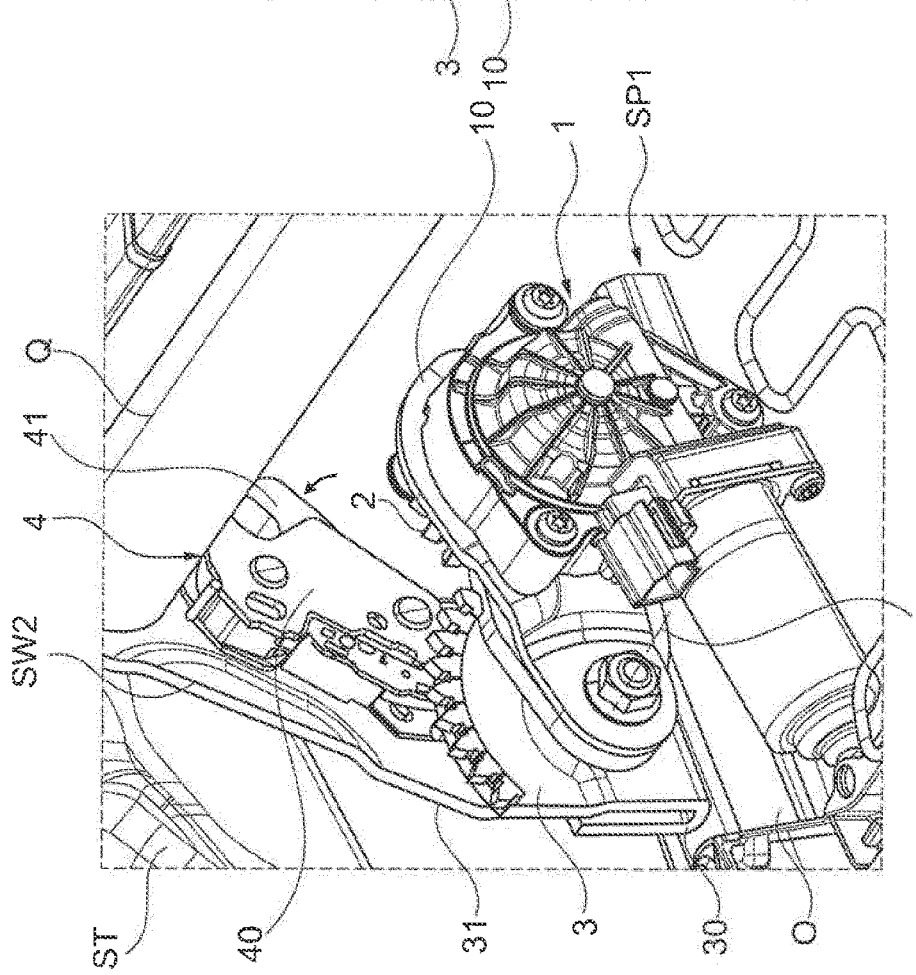

The rocker SW2 is articulated to a seat side part ST of the seat part S away from the swivel axis A. A seat-side-part end of the rocker SW2 is articulated in the region of a transverse tube Q of the seat part S connecting two mutually opposite seat side parts ST to each other. A swivel movement of the rocker SW2 about the swivel axis A on the bearing part 3 thus introduces an adjusting force into the seat part S in the region of the transverse tube Q and leads to an adjustment of the seat side part ST and hence of the seat part S with respect to the vehicle floor B. Due to a swivel movement of the rocker SW2, the rear area of the seat part S is lifted from the rest position shown in FIG. 1 (in anti-clockwise direction) into a position swung forwards as shown in FIG. 2, and hence the seat part S is inclined forwards together with the backrest R (about a swivel axis formed in the region of the front rocker SW1).

Via the lock 4, decoupling of the drive unit 1 from the rear rocker SW2 is possible. When the lock 4 is unlocked and hence transferred into a release position, in which the rotary latch 41 releases the closing bolt 11, the rocker SW2 may be swiveled about the swivel axis A independently of the swiveling lever 10 and hence independently of the drive unit 1. When the lock 4 is unlocked, in other words, a mechanical connection between the swiveling lever 10 and the rocker SW2 may be separated and hence the adjustment mechanism comprising the rocker SW2 may be decoupled from the drive unit 1 and the pinion gear 2, 31. By actuating the lock 4 and hence by releasing a locking with the lock bolt 11, the seat part S consequently may be manually folded forwards without the drive unit 1 having to provide an adjusting force. In this way, the seat part S may be transferred into an adjustment position folded forwards for example for an emergency exit, even if the drive unit 1 may no longer be actuated or is damaged after a crash.

In the design variant of FIGS. 4A and 4B, analogous to the design variant of FIGS. 1, 2 and 3A-3B, the lock 4 is provided on the (rear) rocker SW2 which in turn is pivotally mounted on the rail-mounted bearing part 3 about the swivel axis A. There is likewise provided a swiveling lever 10 mounted on the bearing part 3 about this swivel axis A, which via a lock bolt 11 provided on the swiveling lever 10 may be mechanically coupled with the rocker SW2 via the lock 4.

In contrast to the design variant of FIGS. 1 to 3B, an electromotive drive unit 5 is provided with a spindle gear instead of the pinion gear 2, 31. A drive motor 50 of the drive unit 5, which is fixed in the region of the rail assembly SA, here drives a translationally adjustable drive element in the form of a drive spindle 51. The drive spindle 51 is connected to the swiveling lever 10 on a connecting arm 10a below the swivel axis A of the bearing part 3, namely such that a translational adjustment of the drive spindle 51 along an adjustment direction V extending parallel to the longitudinal axis defined by the rail pair SP1 causes a swivel movement of the swiveling lever 10 about the swivel axis A. Depending on whether the drive spindle 51 is retracted or extended, the swiveling lever 10 consequently is swiveled in the one or the other swivel direction about the swivel axis A on the bearing part 3. The swiveling lever 3 then entrains the rocker SW2 while the lock 4 is locked, and thus again permits the power-operated adjustment of the rocker SW2 and hence of the seat part S in two different adjustment directions (in the direction of the adjustment position and back into a use position).

When the lock 4 is unlocked and hence in a release position, as shown in FIG. 4B, the rocker SW2 is decoupled from the swiveling lever 10 and correspondingly also from the drive unit 5. When the lock is unlocked, the seat part S together with the backrest R consequently may be folded forwards by swiveling the rocker SW2, without the swiveling lever 10 having to be co-adjusted or the drive unit 5 having to be actuated.

To possibly again produce a locking of the lock 4 via the lock bolt 11 and hence mechanically couple the rocker SW2 with the swiveling lever 10 and the drive unit 5, it is merely necessary to again (manually) fold the seat part S to the rear so that the rotary latch 41 of the lock 4 may automatically lock via the lock bolt 11.

In contrast to the representation in FIGS. 1 to 4B, a separation of the adjustment mechanism comprising the rocker SW2 from a transmission coupled with the drive unit 1 or 5, which is provided via the lock 4, may also be provided in a transmission firmly mounted to the side part.

Figure 5A:
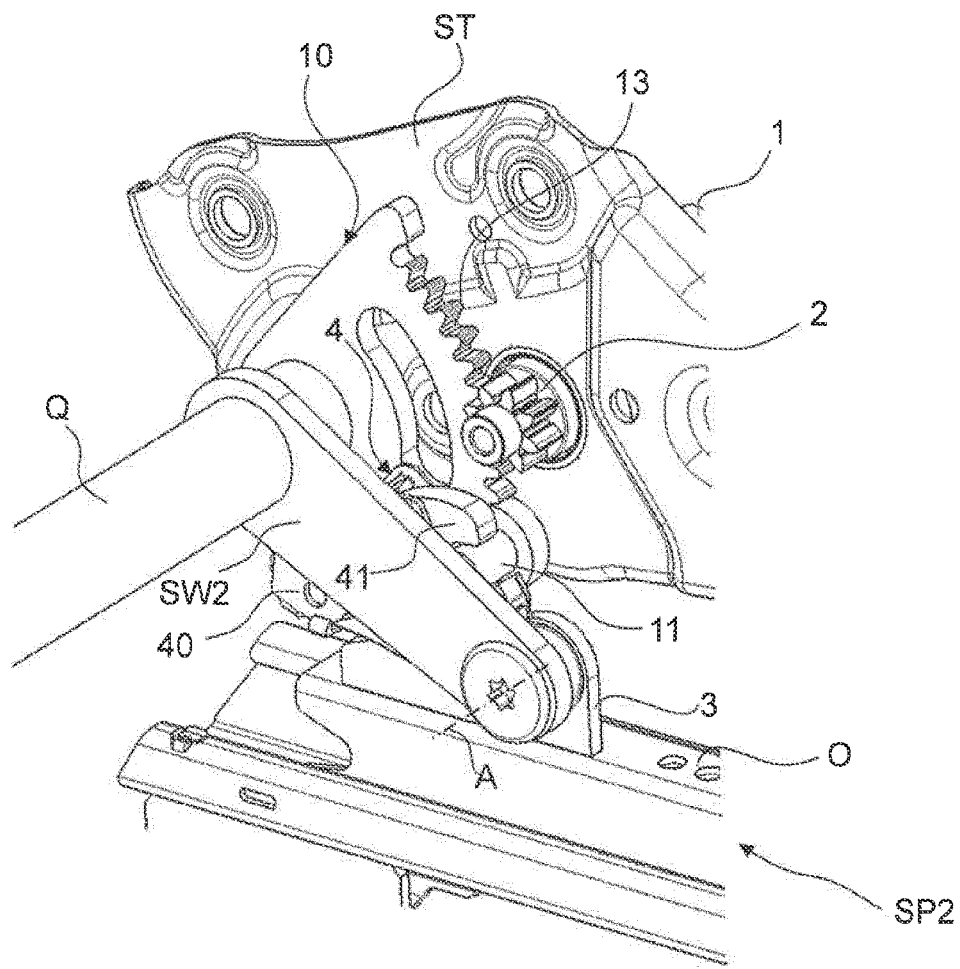
FIGS. 5A-5C, sectionally, show another design variant of a proposed vehicle seat comprising an adjusting device with pinion gear, wherein the drive unit drives a drive pinion rotatably mounted on a seat side part.
Figure 5B:
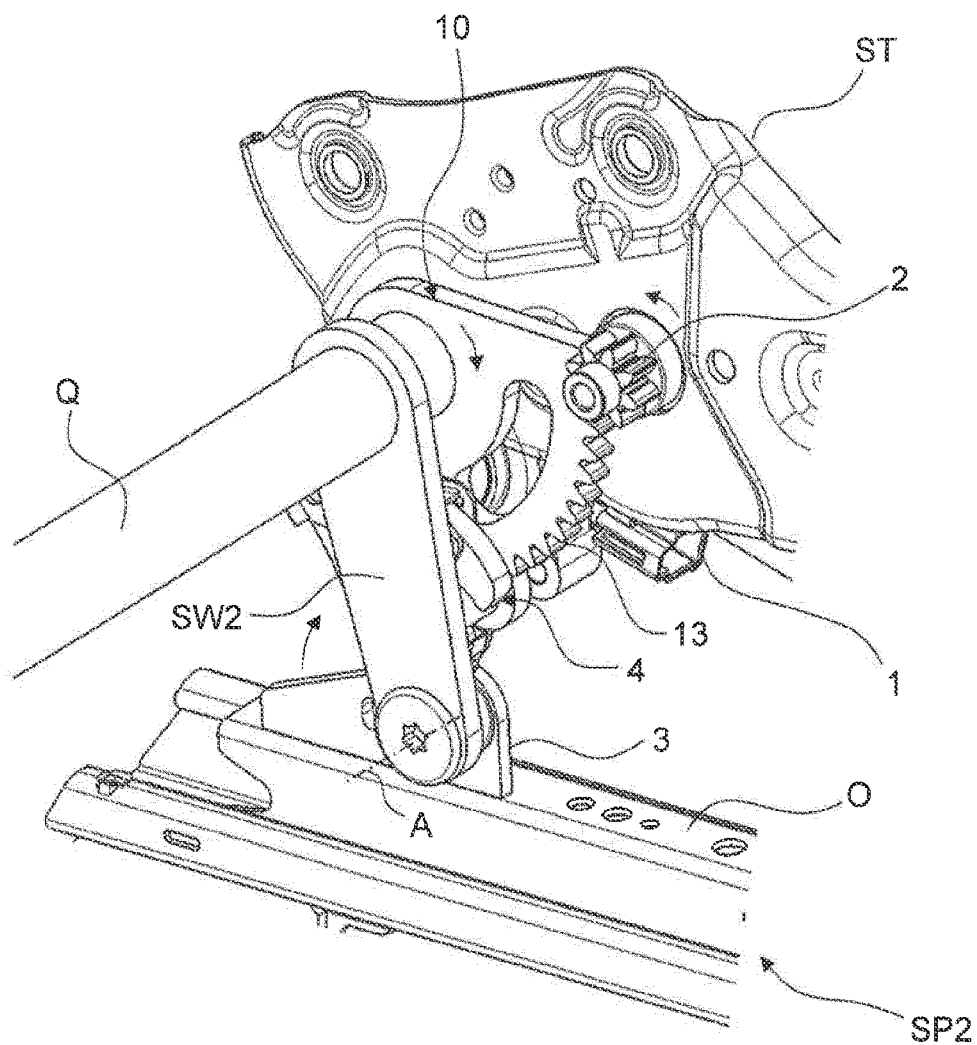
Figure 5C:
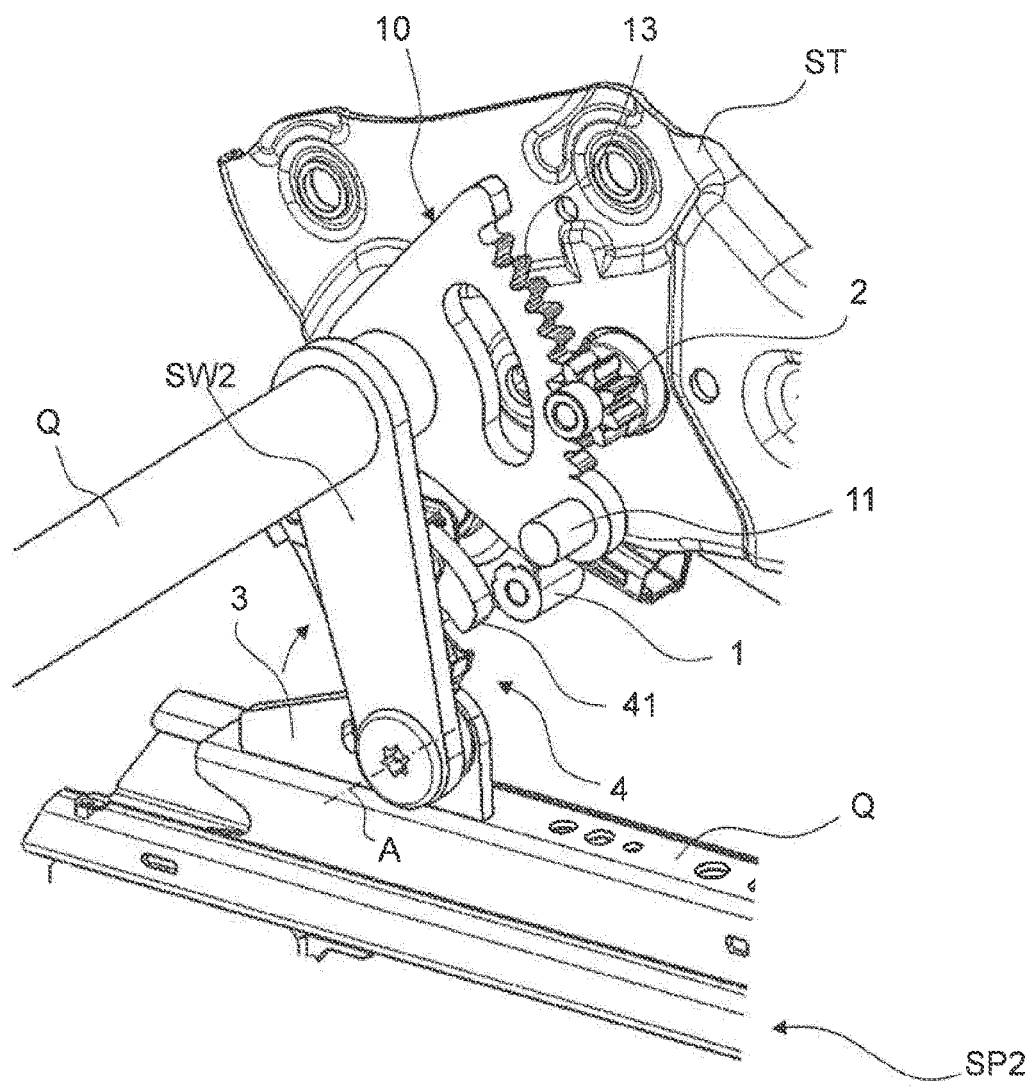

FIGS. 5A, 5B and 5C show various views and sectionally a corresponding design variant for a vehicle seat F with an adjusting device comprising a pinion gear unit. The drive unit 1 comprising the pinion gear is provided on the side part ST. The drive unit 1 arranged on an outside of the side part ST drives a drive pinion 2 rotatably mounted on an opposite inside of the side part ST. This drive pinion 2 is in engagement with a tooth segment 13 of a swiveling lever 10, which in the present case is rotatably mounted on the transverse tube Q fixed with the side part ST.

In the illustrated design variant of FIGS. 5A to 5C the lock 4 is provided on the rocker SW2 opposite the swiveling lever 10 so that the lock 4 is completely accommodated in a space between the swiveling lever 10 and the rocker SW2. In the present case, the lock 4 locks via a lock bolt 11 on the swiveling lever 10. In the illustrated design variant, the lock bolt 11 is formed on the swiveling lever 10. The lock bolt 11 is arranged on the swiveling lever 10 of FIGS. 5a to 5C adjacent to the tooth segment 13. The lock bolt 11 perpendicularly protrudes from the swiveling lever 10 in the direction of the rocker SW2 and, when the lock 4 is locked, permits a mechanical coupling between the swiveling lever 10 and the rocker SW2 pivotally mounted on the rail-mounted bearing part 3.

When the drive pinion 2 is put into rotation by the drive unit 1 while the lock 4 is locked, the drive pinion 2 meshes with the tooth segment 13 of the swiveling lever 10 and thereby drives the swiveling lever 10 to perform a swivel movement relative to the seat side part ST about an axis of rotation defined by the transverse tube Q. Due to the mechanical coupling via the lock 4, the swivel movement of the le10 driven by the drive unit 1 leads to the rocker SW2 also swiveling about the swivel axis A. Due to being rotatably mounted about the swivel axis A, the rocker SW2 has a degree of freedom on the rail-mounted bearing part 3. An adjusting force with a force component directed perpendicularly to the swivel axis A, which is introduced into the rocker SW2 at a distance from the swivel axis A, thus leads to a swivel movement of the rocker SW2 about the swivel axis A. Swiveling of the swiveling lever 10 hence causes a swivel movement of the rocker SW2—with the lock 4 properly locked—and thereby a displacement of the transverse tube Q coupled with the rocker SW2. As the transverse tube Q is fixed to the two opposed seat side parts ST of the seat part S, the seat part S thereby is adjusted.

When the lock 4 corresponding to the representation of FIG. 5C is not locked via the lock bolt 11 of the rocking lever 10, the seat part S may be manually folded forwards into the adjustment position by swiveling the rocker SW2. The swiveling lever 10 and the drive pinion 2 here are not changed in their position relative to each other. The drive unit 1 and the rocker SW2 are mechanically decoupled from each other.

Alternatively or in addition, an exchange of the positions of the lock 4 and of the lock bolt 11 as compared with the representations of FIGS. 1 to 5C of course also is easily possible. Correspondingly, the lock bolt 11 then for example would be provided on the rocker SW2 and the lock would be provided on the swiveling lever 10.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 drive unit
10 swiveling lever (swivel element)
100 bearing plate
10a connecting arm
11 lock bolt (locking element)
13 tooth segment
2 drive pinion (drive element)
3 bearing part
30 base
31 tooth segment
4 lock (locking element)
40 housing
41 rotary latch
5 drive unit
50 drive motor
51 drive spindle (drive element)
A swivel axis
B vehicle floor
F vehicle seat
O upper rail
Q transverse tube
R backrest
S seat part
SA rail assembly
SP1, SP2 rail pair
ST seat side part
SW1, SW2 rocker (rocker component)
V adjustment direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle seat comprising:
a seat part configured to be folded from a use position to an adjustment position with respect to a vehicle floor to provide access to an area disposed behind the vehicle seat;
a rocker component;
a drive unit operatively connected to the rocker component; and
a locking unit configured to be positioned between a release position, so that the seat part is foldable from the use position to the adjustment position, and a locking position, in which the drive unit is operatively disconnected from the rocker component so that the seat part is not foldable from the use position to the adjustment position.

2. The vehicle seat of claim 1, further comprising:
a locking element connected to the rocker component and configured to move the locking unit from the release position to the locking position.

3. The vehicle seat of claim 1, further comprising:
a locking element; and
a swivel element, wherein the drive unit is configured to transmit an adjusting force to the locking element and from the locking element to the swivel element, and from the swivel element to the rocker component.

4. The vehicle seat of claim 3, wherein the drive unit is disposed on the swivel element or a drive element of the drive unit engages the swivel element to transmit the adjusting force.

5. The vehicle seat of claim 1, further comprising:
a swivel element configured to be adjusted by the drive unit, wherein the seat part includes a seat side part, and wherein the locking unit is either disposed on the rocker component, the swivel element, or the seat side part.

6. The vehicle seat of claim 5, wherein the rocker component is coupled to the seat side part so that the seat part is adjustable by external actuation and foldable into the adjustment position, and the swivel element is rotatably mounted to the seat side part or to another portion of the vehicle seat.

7. The vehicle seat of claim 1, further comprising:
a rail assembly including a shiftable rail, wherein the shiftable rail is adjustable to move the vehicle seat along a longitudinal axis.

8. The vehicle seat of claim 7, further comprising:
a bearing part, wherein the rocker component is pivotally mounted to the bearing part and wherein the bearing part is disposed on the shiftable rail.

9. The vehicle seat of claim 1, further comprising:
a backrest coupled to the seat part, wherein the backrest and seat part are configured to be collectively folded from the use position to the adjustment position.

10. The vehicle seat of claim 1, further comprising:
a swivel element adjustable by the drive unit and configured to move the locking unit from the release position to the locking position.

11. The vehicle seat of claim 10, wherein the drive unit is configured to pivot the swivel element.

12. The vehicle seat of claim 10, further comprising:
a bearing part wherein the rocker component is pivotally mounted to the bearing part.

13. The vehicle seat of claim 12, wherein the swivel element is pivotally mounted to the bearing part.

14. The vehicle seat of claim 13, wherein the drive unit includes a translationally adjustable drive element, wherein the translationally adjustable drive element engages the swivel element to transmit an adjusting force generated by the drive unit to the swivel element.

15. The vehicle seat of claim 12, wherein the bearing part includes a number of teeth and the drive unit includes a rotatable drive element, wherein the rotatable drive element and the number of teeth mesh together.

* * * * *